United States Patent Office 3,769,360
Patented Oct. 30, 1973

3,769,360
PROCESS FOR TRANSALKYLATING DIETHYL BENZENE
Earl F. Harper, Oakmont, and Roger C. Williamson, Allison Park, Pa., assignors to Gulf Research & Development Company, Pittsburgh, Pa.
No Drawing. Filed Apr. 9, 1971, Ser. No. 132,887
Int. Cl. C07c *3/62*
U.S. Cl. 260—672 T                    7 Claims

ABSTRACT OF THE DISCLOSURE

Process for transalkylating diethyl benzene to ethyl benzene which involves reacting diethyl benzene and benzene in the vapor phase in the presence of a zeolitic molecular sieve catalyst.

---

This invention relates to the transalkylation of diethylbenzene in the presence of a zeolitic molecular sieve catalyst to obtain ethyl benzene, and particularly to a process wherein benzene is alkylated with ethylene, preferably in the presence of a zeolitic molecular sieve catalyst, to obtain a reaction product predominating in ethyl benzene and containing lesser amounts of diethyl benzene, as well as unreacted benzene, and said reaction product is then treated in the presence of a zeolitic molecular sieve catalyst to transalkylate said diethyl benzene to ethyl benzene.

Ethyl benzene can be produced by the alkylation of benzene with ethylene in the presence of any well-known alkylation catalysts, for example, aluminum chloride, a zeolitic molecular sieve catalyst such as that used in the transalkylation herein, etc. using well-known alkylation conditions. However, depending upon the alkylation catalyst employed and the alkylation conditions found to be suitable, not only will desired ethyl benzene be produced but from about one to about 40 percent by weight, generally from about six to about 15 percent by weight of the total alkylate obtained will be composed of di-, tri- and tetraethyl benzenes of which about 99 to about 65 percent by weight, generally about 97 to about 85 percent by weight, will be diethyl benzenes. In accordance with the process defined and claimed herein di-, tri- and/or tetraethyl benzenes are subjected to transalkylation conditions in the presence of benzene and a zeolitic molecular sieve catalyst to convert the same to ethyl benzene.

In U.S. Pat. No. 3,385,906 to Kaufman it is shown that diisopropyl benzene can be transalkylated to cumene in the presence of a zeolitic molecular sieve catalyst. In column 5, lines 11 to 14, the patentee states that in order to obtain the desired conversion it is essential to maintain a liquid phase system. We have found, instead, that in order to transalkylate di-, tri- and/or tetraethyl benzenes to ethylbenzene in the presence of a zeolitic molecular sieve catalyst it is imperative that the system be maintained in essentially the vapor phase.

The di-, tri- and/or tetraethyl benzenes that are to be transalkylated herein can be obtained from any source, but in a preferred embodiment are obtained by subjecting benzene to alkylation with ethylene in the presence of any well-known alkylation catalyst, but preferably in the presence of the zeolitic molecular sieve catalyst used in the process defined and claimed herein. For example, an alkylation product can be obtained by passing benzene and ethylene in a molar ratio of about 1:1 to about 50:1, preferably about 4:1 to about 15:1, upwardly through a bed of said zeolitic molecular sieve catalyst at a weight hourly space velocity (combined weight of benzene and ethylene per weight of catalyst per hour) of about 0.1 to about 100, preferably about one to about 20, a temperature of about 100° to about 400° C., preferably about 150° to about 270° C., and a pressure of about 0 to about 2000 pounds per square inch gauge, preferably about 100 to about 600 pounds per square inch gauge. The product obtained will contain, as previously noted, unreacted benzene, ethyl benzene and di-, tri- and/or tetraethyl benzenes. Simple distillation will suffice to remove benezene and ethyl benzene therefrom. The remaining polyalkyl benzenes can then be subjected to transalkylation. However, if only one or two of the polyalkyl benzenes is to be subjected to transalkylation herein, distillation can also be used to obtain such charge. In a preferred embodiment, however, the entire alkylation product is used as charge to the transalkylation stage.

The transalkylation defined and claimed herein is simply effected, in batch operations or continuously. Thus, the entire alkylation product, as hereinabove defined, or any one or combination of the polyalkyl benzenes, together with additional benzene, if needed, is passed upwardly through a bed of zeolitic molecular sieve catalyst under the critical reaction conditions that will be defined hereinafter. The molar ratio of benzene to polyalkyl benzene is from about 200:1 to about 1:1, preferably from about 30:1 to about 4:1. Most critical to successful transalkylation lies in maintaining the reactants, benzene and the polyalkyl benzenes or polyalkyl benzene, in the vapor phase. Conditions are selected sufficient to maintain the desired vapor phase. Thus, the temperature lies within the range of about 100° to about 500° C., preferably within the range of about 150° to about 270° C., and the pressure from about 5 to about 500 pounds per square inch gauge, preferably within the range of about 16 to about 300 pounds per square inch gauge, with such pressure being lower than the pressure prevailing in the alkylation stage, when a zeolitic molecular sieve catalyst is used in said latter stage. A space velocity (combined weight of benzene and polyalkyl benzene or polyalkyl benzenes per weight of catalyst per hour) of about 0.1 to about 80, preferably about one to about 15, can be used. At the end of the reaction period the individual components, for example, unreacted benzene, ethylbenzene and diethyl benzene can be recovered from the reaction product by simple distillation techniques.

The catalysts used in the transalkylation herein, and which are preferably used in alkylation benzene with ethylene to produce polyalkyl benzenes used as charge in the transalkylation stage, are zeolitic molecular sieve catalysts, such as defined and used in said U.S. Pat. 3,385,906, that is, a crystalline zeolitic molecular sieve catalyst, for example, natural or synthetic hydrated metal alumino-silicates, consisting basically of an open, three-dimensional framework of $SiO_4$ and $AlO_4$ tetrahedra, having a silica to alumina molar ratio of at least about 3.0, a pore size large enough to permit internal absorption of benzene and not more than 90 percent of their aluminum atoms associated with monovalent cations, for example, sodium or potassium, and the remainder with polyvalent cations, for example, lanthanum, cerium, etc. and/or ammonium or hydrogen. A particularly effective zeolite is a zeolite Y such as defined in U.S. Pat. No. 3,130,007. An example of zeolite Y will fall within the following chemical composition:

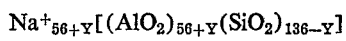

wherein $y$ generally has a value of about 0, but can vary from $-8$ to $+20$.

The process of this invention can further be illustrated by the following, in each run of which a Y zeolitic molecular sieve of the following unit cell formula was used:

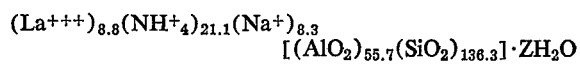

which had been previously heated to a temperature of about 550° C. for about one hour, with, presumably, the loss of $NH_3$ and $H_2O$ therefrom. In each of the runs a one-half inch inner diameter 52-inch long stainless steel reactor, equipped with a three-inch by 50-inch outer jacket filled with dixylylethane as a heat transfer medium was used. Heat was supplied with a Calrod electrical heater and was controlled by a thermoelectric controller. A thermowell extended coaxially through the reactor. The temperature in the reactor was measured by thermocouples evenly spaced through the preheat section, catalyst bed and support section. The pressure was controlled by means of a pressure control valve in the effluent line. Feed to the reactor was pumped upflow by an adjustable stroke proportioning pump from a calibrated feed tank. The reactor was filled with a preheat section of glass beads to a depth of 14 inches. The catalyst section, 13 inches in depth, was composed of 10 grams of the specific 18 to 20 mesh Y-type zeolitic molecular sieve catalyst defined immediately hereinabove diluted with two volumes of 8 to 10 mesh quartz. The remaining reactor length was filled with glass beads. The effluent from the reactor was cooled and collected in a gas-liquid separator. The off-gas was measured by a wet test meter, while the liquid product was recovered and weighed.

EXAMPLE I

To a pressure cylinder 168.7 pounds of benzene was added. By means of a dip leg 6.06 pounds of ethylene was dissolved in the benzene. The feed cylinder was pressured with nitrogen to keep the ethylene in solution at around 250 pounds per square inch gauge. The molar ratio of benzene to ethylene was 10:1. Using the above apparatus and feed a series of alkylation runs was carried out using different space velocities (number of grams of feed per hour per gram of catalyst charged to the reactor), pressures and temperatures. Complete conversion of ethylene was found except where noted. The results obtained are set forth in Table I and Table II below. In the tables efficiencies are expressed in mol percent and are defined as the mols of ethyl benzene, diethyl benzene, triethyl benzene and tetraethyl benzene produced per mol of benzene or ethylene reacted times one hundred. Vent gases from the reactor was analyzed by mass spectographic methods. The liquid products were analyzed by gas chromatography.

90.96 mol percent ethyl benzene, 5.53 mol percent diethyl benzene, 1.91 mol percent triethyl benzene and 1.06 mol percent tetraethyl benzene. When this run was repeated at 232° C., 500 pounds per square inch gauge and a liquid hourly space velocity of 22.9, all of the ethylene was converted with molar efficiencies of 91.7 percent to ethyl benzene, 5.24 percent to diethyl benzene, 2.13 percent to triethyl benzene and 0.94 percent to tetraethyl benzene. From these two runs it can be seen that the expected improvement in yields to ethyl benzene was not obtained.

EXAMPLE III

An attempt was made to transalkylate diethyl benzene to ethyl benzene by passing 1562 grams of benzene and 27.5 grams of diethyl benzene over the zeolitic molecular sieve catalyst at a temperature of about 232° C., a pressure of about 500 pounds per square inch gauge and a liquid hourly space velocity of 20.0, where said 500 pounds per square inch gauge is enough to insure a liquid phase. The effluent from the reactor showed that only 4.7 mol percent of the diethyl benzene was converted. Again the same feed was passed over the same catalyst at 232° C., a pressure of 260 pounds per square inch gauge and a liquid hourly space velocity of 18.4, where said 232° C. and 260 pounds per square inch gauge results in essentially a vapor phase. Analysis of the effluent showed that 55.4 mol percent of the diethyl benzene was converted to ethyl benzene.

EXAMPLE IV

An additional series of runs was made wherein 1706.8 grams of benzene and 293.2 grams of diethyl benzene were passed through the zeolitic molecular sieve catalyst at various pressure levels using a temperature of 210° C. and a liquid hourly space velocity of 5.3. The data obtained are tabulated below in Table II.

TABLE II

| | Run number | | | Feed |
|---|---|---|---|---|
| | 1 | 2 | 3 | |
| Pressure, pounds per square inch gauge | 300 | 200 | 80 | |
| Components, weight percent: | | | | |
| Benzene | 84.70 | 84.70 | 79.07 | 85.34 |
| Ethyl benzene | 1.29 | 1.46 | 15.14 | |
| Diethyl benzene | 13.94 | 13.76 | 4.84 | 14.66 |
| Triethyl benzene | 0.01 | 0.11 | 0.25 | |
| Tetraethyl benzene | 0.03 | 0.02 | 0.05 | |

TABLE I

| | Run number | | | | | | | | | |
|---|---|---|---|---|---|---|---|---|---|---|
| | 1 | 2 | 3 | 4 | 5 | 6 | 7 | 8 | 9 | 10 |
| Temperature | 173 | 192 | 210 | 232 | 210 | 210 | 210 | 210 | 232 | 232 |
| Pressure, pounds per square inch gauge | 550 | 550 | 600 | 600 | 600 | 600 | 600 | 600 | 300 | 80 |
| Space velocity | 19.47 | 19.46 | 19.20 | 10.0 | 19.2 | 39.8 | 81.1 | 4.3 | 8.8 | 23 |
| Efficiencies in mol percent, based on benzene converted to— | | | | | | | | | | |
| Ethyl benzene | 87.52 | 85.87 | 88.26 | 87.32 | 88.26 | 88.16 | 88.43 | 89.25 | 89.31 | a 98.6 |
| Diethyl benzene | 8.54 | 9.67 | 8.31 | 8.14 | 8.31 | 8.26 | 8.33 | 8.67 | 8.77 | 1.4 | a Ethylene conversion only 25 to 30 percent.

The above clearly shows that when one has 100 percent ethylene conversion that varying the conditions of alkylation has little or no appreciable effect on the efficiency to ethyl benzene and that an equilibrium between the latter and diethyl benzene is obtained in each case. The results, at the lower pressure, are derived somewhat from the low pressures, but mostly are due to the benzene/propylene ratio being essentially equal to 40–30 to 1.

EXAMPLE II

It might be though, therefore, that if diethyl benzene were added to the feed to the alkylation unit with an excess of benzene an increase in efficiency to ethyl benzene would therefore result. To this end a feed containing 5290 grams of benzene (95.45 weight percent), 62.0 grams of diethyl benzene (1.12 weight percent) and 190 grams of ethylene (3.43 weight percent) was passed over the zeolitic molecular sieve catalyst at 234° C., 500 pounds per square inch gauge and a liquid hourly space velocity of 40.4 with 100 percent conversion of ethylene. The efficiency, in mol percent based on the benzene reacted, was In each of Runs Nos. 1 and 2 above, as well as in the runs of Example III, the components in the reaction system were substantially in the liquid phase and poor conversion of diethyl benzene to ethyl benzene resulted. In Run No. 3, however, wherein a vapor phase was present excellent conversion was obtained. In order to show what would happen under equilibrium conditions the product from Run No. 1 was recycled over the catalyst six times at a temperature of 210° C., 80 pounds per square inch gauge and a space velocity of 5.5, with the system being in the vapor phase. The resulting product analyzed 76.60 percent by weight of benzene, 20.63 percent by weight of ethyl benzene and 0.24 percent by weight of diethyl benzene.

EXAMPLE V

A series of runs was made wherein benzene was alkylated with ethylene over the specific zeolite molecular sieve catalyst used hereinabove and the total effluent was treated in a separate reactor over the same catalyst. In the first reactor benzene and ethylene were used in a 10:1 molar ratio and the reaction was carried out at a temperature of 224° C., a pressure of 500 pounds per square inch gauge at a liquid weight hourly space velocity of 21. The conditions employed in the second reactor and the results obtained are tabulated below in Table III.

TABLE III

| | Feed | Run number | | | | | | | | | |
|---|---|---|---|---|---|---|---|---|---|---|---|
| | | 1 | 2 | 3 | 4 | 5 | 6 | 7 | 8 | 9 | 10 |
| Reaction conditions: | | | | | | | | | | | |
| Temperature, ° C | | 214 | 213 | 213 | 213 | 213 | 212 | 212 | 212 | 212 | 212 |
| Pressure, pounds per square inch gauge | | 16 | 34 | 60 | 80 | 100 | 120 | 150 | 180 | 200 | 250 |
| Liquid weight, hourly space velocity | | 3.3 | 3.1 | 3.2 | 2.3 | 3.1 | 3.1 | 3.0 | 3.0 | 2.9 | 2.9 |
| Efficiencies based on benzene, mol percent: | | | | | | | | | | | |
| Ethyl benzene | 89.51 | 95.39 | 95.46 | 95.76 | 97.88 | 98.72 | 99.33 | 97.35 | 94.63 | 93.40 | 89.09 |
| Methyl ethyl benzene | 0.50 | 0.63 | 0.60 | 0.63 | 0.75 | 0.63 | 0.43 | 0.72 | 0.56 | 1.64 | 0.67 |
| Diethyl benzene | 8.42 | 3.98 | 3.94 | 3.61 | 1.37 | 0.65 | 0.24 | 1.93 | 4.81 | 5.04 | 8.01 |
| Triethyl benzene | 0.98 | | | | | | | | | 0.47 | 1.47 |
| Tetraethyl benzene | 0.59 | | | | | | | | | 0.45 | 0.75 |

The above data show that best results are obtained when the transalkylation reaction is carried out in the vapor phase while operating in a pressure range of about 16 to about 180 pounds per square inch gauge and that substantially complete conversion of diethyl benzene to ethyl benzene occurs when the pressure is maintained in the range of about 100 to about 120 pounds per square inch gauge.

Obviously, many modifications and variations of the invention, as hereinabove set forth, can be made without departing from the spirit and scope thereof, and therefore only such limitations should be imposed as are indicated in the appended claims.

We claim:

1. A process for transalkylating diethyl benzene to ethyl benzene which comprises reacting in the vapor phase a feed consisting of benzene and diethyl benzene in the presence of a catalyst consisting of a zeolitic molecular sieve having a pore size large enough to permit the internal absorption of benzene, a silica to alumina molar ratio of at least about 3.0 and no more than 90 percent of aluminum atoms associated with monovalent cations at a temperature of about 210° to about 232° C. and a pressure of about 80 to about 260 pounds per square inch gauge.

2. The process of claim 1 wherein the molar ratio of benzene to diethyl benzene is about 200:1 to about 1:1.

3. The process of claim 1 wherein the molar ratio of benzene to diethyl benzene is about 30:1 to about 4:1.

4. The process of claim 1 wherein the charge is passed upwardly through said catalyst using a space velocity of about 0.1 to about 80.

5. The process of claim 1 wherein the charge is passed upwardly through said catalyst using a space velocity of about one to about 15.

6. The process of claim 1 wherein the remainder of the cations associated with said aluminum atoms are rare earth metal cations.

7. The process of claim 1 wherein the remainder of the cations associated with said aluminum atoms are lanthanum cations.

References Cited
UNITED STATES PATENTS

| | | | |
|---|---|---|---|
| 3,551,510 | 12/1970 | Pollitzer et al. | 260—672T |
| 3,385,906 | 5/1968 | Kaufman | 260—672T |
| 3,410,921 | 11/1968 | Pollitzer | 260—672T |
| 3,442,795 | 5/1969 | Kerr et al. | 260—672T |
| 3,463,744 | 8/1969 | Mitsche | 260—672T |
| 3,629,351 | 12/1971 | Olive et al. | 260—672T |

CURTIS R. DAVIS, Primary Examiner

U.S. Cl. X.R.

260—671 R